United States Patent
Zihnioglu

(10) Patent No.: US 11,736,435 B2
(45) Date of Patent: *Aug. 22, 2023

(54) AUTOMATIC IPV6/IPV4 FALLBACK APPROACH IN PROXY NETWORKS

(71) Applicant: Webshare Software Company, San Mateo, CA (US)

(72) Inventor: Asim Utku Zihnioglu, San Mateo, CA (US)

(73) Assignee: Webshare Software Company, Covina, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,558

(22) Filed: Nov. 29, 2022

(65) Prior Publication Data

US 2023/0087327 A1 Mar. 23, 2023

Related U.S. Application Data

(63) Continuation of application No. 17/167,474, filed on Feb. 4, 2021, now Pat. No. 11,522,826.

(51) Int. Cl.
*H04L 61/251* (2022.01)
*H04L 61/4511* (2022.01)
(Continued)

(52) U.S. Cl.
CPC ............ *H04L 61/251* (2013.01); *H04L 61/10* (2013.01); *H04L 61/4511* (2022.05); *H04L 61/5061* (2022.05); *H04L 63/0281* (2013.01)

(58) Field of Classification Search
None
See application file for complete search history.

(56) References Cited

U.S. PATENT DOCUMENTS 11,310,341 B2 * 4/2022 Shribman ............ H04L 63/0407
2013/0067085 A1 * 3/2013 Hershko ................. H04L 67/02
709/225

(Continued)

FOREIGN PATENT DOCUMENTS

CN 109543121 A 3/2019

OTHER PUBLICATIONS

Wing et al., "Happy Eyeballs: Success with Dual-Stack Hosts", Internet Engineering Task Force (IETF), The Internet Society, https://www.rfc-editor.org/info/rfc6555, dated Apr. 6, 2012, 16 pages.

(Continued)

*Primary Examiner* — Mohamed Ibrahim
(74) *Attorney, Agent, or Firm* — Hickman Becker Bingham Ledesma LLP

(57) ABSTRACT

The method for an automated IPv6/IPv4 fallback approach in proxy networks is presented. In some embodiments, the method comprises receiving, at a proxy server, a request from a client executing on a client computer for access to a target computer; determining identification-information of the client; determining an address pair including an IPv6 address and an IPv4 address of the proxy server; assigning the address pair to the identification-information of the client; establishing a first communications connection between the client computer and the proxy server using one of IP addresses included in the address pair, and a second communications connection between the proxy server and the target computer using one of IP addresses included in the address pair; and facilitating a network packet flow between the client computer and the target computer using the first communications connection and the second communications connection.

20 Claims, 13 Drawing Sheets

(51) Int. Cl.
  *H04L 61/5061*  (2022.01)
  *H04L 61/10*    (2022.01)
  *H04L 9/40*     (2022.01)

(56) References Cited

U.S. PATENT DOCUMENTS

| | | | |
|---|---|---|---|
| 2016/0150043 A1 | 5/2016 | Petronic | |
| 2018/0191672 A1 | 7/2018 | Torres | |
| 2019/0182208 A1* | 6/2019 | Duleba | H04L 61/4511 |
| 2020/0128056 A1* | 4/2020 | Simotas | H04L 65/611 |
| 2022/0103579 A1* | 3/2022 | Shi | H04L 61/4511 |
| 2022/0247715 A1 | 8/2022 | Zihnioglu | |

OTHER PUBLICATIONS

The International Searching Authority, "Search Report" in Application No. PCT/US2022/014848, dated Apr. 20, 2022, 16 pages.

Franks et al., "HTTP Authentication: Basic and Digest Access Authentication", Internet Engineering Task Force (IETF), The Internet Society, http://www.sanface.com/txt2pdf.html, dated Jun. 1, 1999, 36 pages.

Fielding et al., "Hypertext Transfer Protocol—HTTP/1.1", Internet Engineering Task Force (IETF), The Internet Society, http://www.sanface.com/txt2pdf.html, dated Jun. 1, 1999, 178 pages.

European Patent Office, "Search Report" in Application No. 21208204.4-1231, dated Mar. 31, 2022, 10 pages.

Current Claims in Application No. PCT/US2022/014848, dated Apr. 2022, 5 pages.

Brzozowski et al., "Comcast IPv6Trial/Deployment Experiences", Internet Engineering Task Force (IETF), The Internet Society, https://datatracker.ietf.org/doc/html/draft-jjmb-v6ops-comcast-ipv6-experiences-02, dated Oct. 2, 2011,12 pages.

Zihnioglu, U.S. Appl. No. 17/167,474, filed Feb. 4, 2021, Notice of Allowance and Fees Due, dated Aug. 15, 2022.

Zihnioglu, U.S. Appl. No. 17/167,474, filed Feb. 4, 2021, Non-Final Rejection dated Apr. 22, 2022.

* cited by examiner

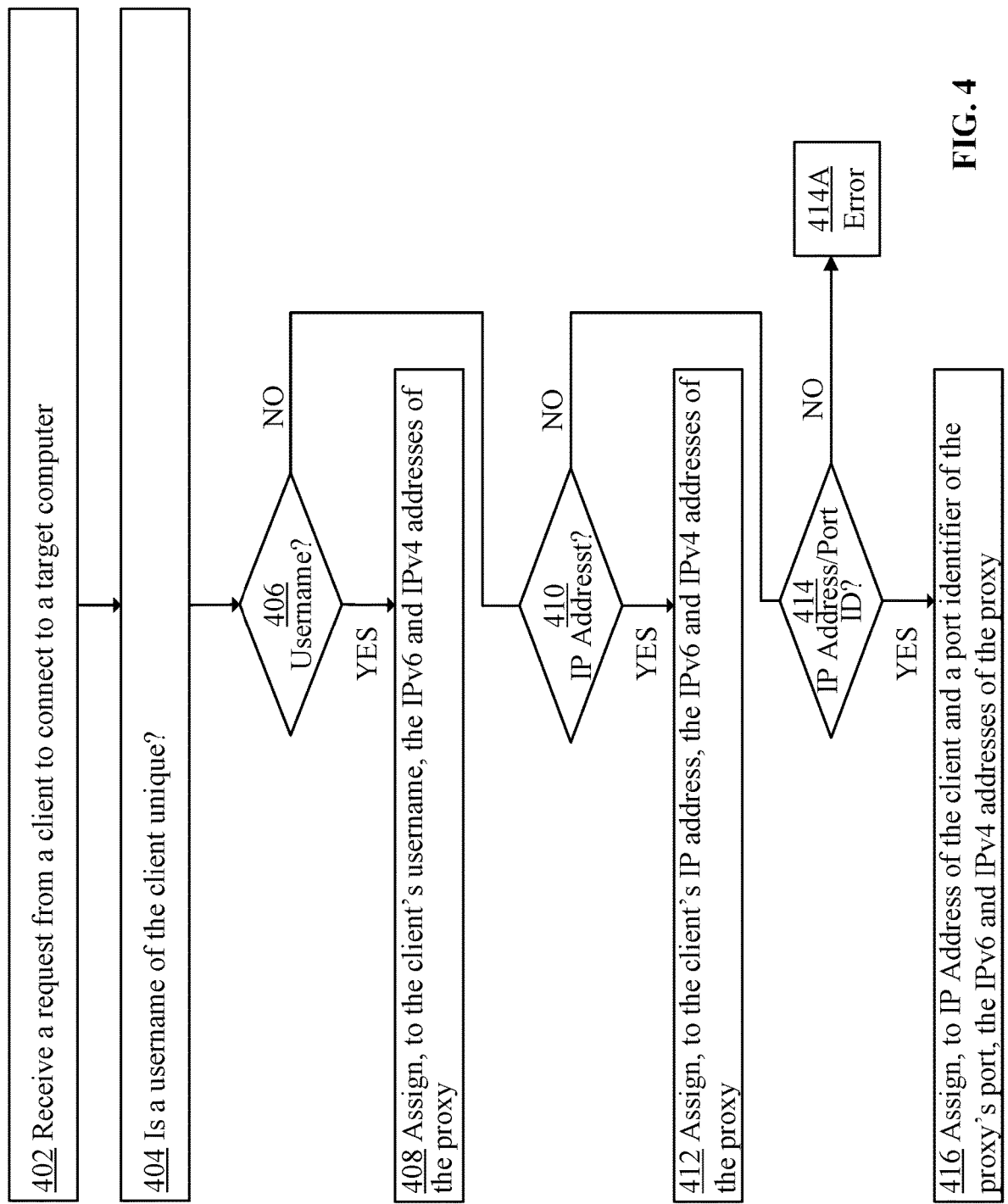

AUTOMATIC IPV6/IPV4 FALLBACK APPROACH IN PROXY NETWORKS

BENEFIT CLAIM

This application claims the benefit under 35 U.S.C. § 120 as a Continuation of application Ser. No. 17/167,474, filed Feb. 4, 2021, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present disclosure relates to computer networking. More specifically, some embodiments of the present disclosure relate to an automated IPv6/IPv4 fallback approach in a proxy network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-based proxy servers facilitate communications between computers implemented in computer networks. A typical proxy server usually receives requests from client computers for providing data or services from target computers. Upon receiving the requests, the proxy forwards the requests to the target computers configured to provide the requested data/services. In response to transmitting the requests to the target computers, the proxy receives the requested data/services from the target computers and forwards the received data/services to the client computers.

Proxy servers may be implemented as a network of proxy servers. The proxy server network may integrate, for example, a Web proxy server configured to handle Hypertext Transfer Protocol (HTTP) requests received from client computers, transmit the HTTP requests to target computers, receive HTTP responses from the target computers, and communicate the HTTP responses to the client computers. The proxy server network may also integrate Virtual Private Network (VPN) proxy servers that are configured to handle VPN-based requests and responses. Other types of proxy servers may also be integrated in the proxy server networks.

A proxy server is usually configured as an intermediary between a client computer and a target computer to facilitate implementations of security measures and to act as a shield between the client computer and the target computer. The configuration allows preventing the client computer and the target computer from being aware of each other network addresses. The proxy may implement the shield-functionalities by configuring on the proxy, for example, a network address translation functionalities and a multi-hop routing functionalities for a proper routing of requests and responses between the clients and targets.

Functionalities of a proxy server acting as an intermediary may be implemented in a variety of ways. According to one approach, the proxy may hide a network address of a client computer from a target computer and hide a network address of the target computer from the client computer. Typically, a network address is defined as an identifier of a computer implemented in a computer network and may be used in, for example, headers of the network packets or segments routed by routers and switches between the computers. Examples of communications protocols used to route the packets/segments between the computers include the Internet Protocol (IP), the Transmission Control Protocol (TCP), the Hypertext Transfer Protocol (HTTP), the Voice over IP (VoIP) protocol, and the like.

Once a client computer establishes a communications connection with a proxy server in a proxy-based network, the proxy establishes a communications connection with the target computer. The two communications connections may be "concatenated" and used as a virtual communications link between the client computer and the target computer. The virtual link spans the communications connection between the client computer and the proxy server and the communications connection between the proxy server and the target computer.

A proxy has usually assigned a pool of IP addresses that the proxy may use to mask actual IP addresses of other computers. For example, the proxy may mask the IP addresses of client computers by assigning the proxy's own IP addresses to the IP addresses of the client computers. The assignment may be performed according to various "IP address allocation" policies. According to one policy, the proxy may mask an actual IP address of a client by associating the authentication credentials of the client with one of the IP addresses of the proxy. This may be useful when the authentication credentials of the client uniquely identify the client within the network that implements the proxy. Depending on the implementation, the authentication credentials may include a username, a user password, or both. For example, if the username is unique, then the proxy may associate the username with the "y.y.y.1" IP address of the proxy. An example assignment may be represented as:

$$[username:y.y.y.1]. \quad (1)$$

According to another policy, the proxy may mask an actual IP address of the client by associating an IP address of the client with one of the IP addresses of the proxy. For example, if the client IP address is "x.x.x.1," then the proxy may assign an "y.y.y.1" IP address of the proxy to the "x.x.x.1" address. The assignment may be represented as:

$$[x.x.x.1:y.y.y.1]. \quad (2)$$

According to other policy, the proxy may mask the client's actual IP address by associating a tuple (comprising an IP address of the client and a port identifier of the port configured on the proxy and on which the proxy received a connection request from the client) with one of the IP addresses of the proxy. This may be useful if more than one user contacts the proxy from the same client IP address. Hence, if the client IP address is "x.x.x.1" and a port on which the proxy received a connection request from the client has a port ID, then the proxy may assign the proxy's "y.y.y.1" IP address to a tuple comprising "x.x.x.1" and the port ID. The assignment may be represented as:

$$[x.x.x.1, port\ ID:y.y.y.1]. \quad (3)$$

The above examples of the allocation policies create a "1:1" relationship between the policy input (i.e., a client user's username, a client IP address, or a client IP address/port ID of a port configured on the proxy) and the policy output (i.e., an IP address of the proxy).

However, in conventional IP address allocation policies, the 1:1 assignment relationship can be created using either an IPv4 address of a proxy, or IPv6 address of a proxy, but it cannot be created using both IPv6 and IPv4 addresses of the proxy concurrently in the same assignment.

BRIEF DESCRIPTION OF THE DRAWINGS

Some embodiments of the present approach are illustrated by way of example, and not in way by limitation, in the figures of the accompanying drawings and in which like reference numerals refers to similar elements and in which:

FIG. 4 is a flow chart depicting an example implementation of an extended allocation policy according to some embodiments.

DETAILED DESCRIPTION

Figure 1A:
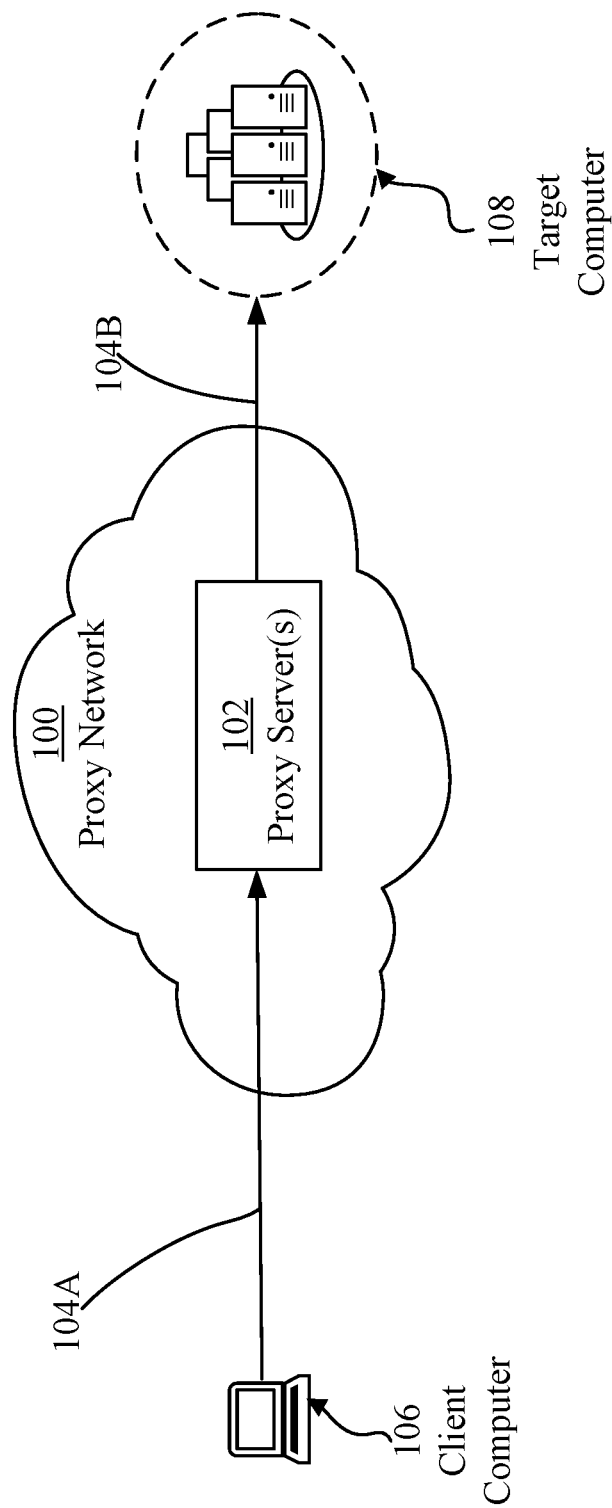
FIG. 1A is a diagram depicting an example proxy network in which some embodiments are implemented.

In the following description, for the purposes of explanation, numerous specific details are set forth in order to provide a thorough understanding of some embodiments of the present approach. It will be apparent, however, that some embodiments may be practiced without these specific details. In other instances, well-known structures and devices are shown in block diagram form in order to avoid unnecessarily obscuring some embodiments.

The detailed description is organized below according to the following outline:
1.0. OVERVIEW
2.0. EXAMPLES OF PROXY NETWORKS
3.0. EXTENDED ALLOCATION POLICY
  3.1. IP ADDRESSES OF A PROXY
  3.2. IDENTIFICATION INFORMATION OF A CLIENT
  3.3. ASSIGNING A PAIR OF IP ADDRESSES OF A PROXY TO A USERNAME OF A CLIENT
  3.4. ASSIGNING A PAIR OF IP ADDRESSES OF A PROXY TO AN IP ADDRESS OF A CLIENT
  3.5. ASSIGNING A PAIR OF IP ADDRESSES OF A PROXY TO A TUPLE
4.0. ESTABLISHING A VIRTUAL CONNECTION BETWEEN A CLIENT AND A TARGET UTILIZING AN EXTENDED ALLOCATION POLICY
  4.1. QUERYING A DNS SERVER FOR IP ADDRESSES OF A TARGET COMPUTER
  4.2. IPV6-BASED APPROACH
  4.3. FALLBACK IPV4 APPROACH
5.0. IMPROVEMENTS PROVIDED BY CERTAIN EMBODIMENTS
6.0. HARDWARE IMPLEMENTATION
7.0. GENERAL CONSIDERATIONS
1.0. Overview In some embodiments, an automated IPv6/IPv4 fallback approach for proxy networks is presented. The approach allows extending an IP address allocation policy to allow the proxy to assign, to identification-information of a client, an address pair comprising an IPv6 address and an IPv4 address of the proxy at the same time when the association is created. The IP address pair of the proxy is assigned to the identification-information of the client in the same assigning step, and thus it is readily-available to the proxy when the proxy attempts to establish either an IPv6-based connection or an IPv4-based connection with another computer. For simplicity of the description, the extended address allocation policy is referred herein also as the "extended policy" or the "policy."

According to the extended policy, the process described herein involves associating, to identification-information of a client, an IP address pair including an IPv6 address and an IPv4 address of the proxy. This is different than in conventional approaches in which just one IP address (either an IPv6 address or an IPv4 address) of the proxy is assigned to the identification-information of the client.

A proxy may apply the extended policy when the proxy receives, for example, a request from a client to authenticate to the proxy and/or to connect to a target computer. Upon receiving the request, the proxy applies the extended policy to create an association between the identification-information of the client and an address pair including an IPv6 address and an IPv4 address of the proxy that the proxy selects from a pool of its own, available IP addresses.

One of the benefits of the presented technology is the ability to utilize the IPv6 addresses more broadly and reliably than it was done in the past. The presented approach includes an extended address allocation policy for the proxy networks that provides the automated mechanisms for a concurrent assignment of both an IPv6 address and an IPv4 address of the proxy to the identification information of the client. In some embodiments, the approach allows utilizing the IPv6 address first, and if the utilization of the IPv6 address fails for some reason, automatically falling back to utilizing the IPv4 address without any modifications to the already-created addresses allocation.

The presented policy allows creating a 1:1 relation between identification-information of a client and an address pair including both an IPv6 address and an IPv4 address of the proxy. Since a pool of available IPv4 addresses is about to be exhausted in the next decade or so, and since fewer IPv4 addresses are available for assignments, using the IP address pairs including IPv6 and IPv4 addresses solves the limitations of the IPv4 address space.

According to the present approach, both the IPv6 addresses and IPv4 addresses of the proxy are used in the allocation policy. Using both an IPv6 address and an IPv4 address of a proxy in the address allocation assignment allows taking an advantage of a very large IPv6 address space and, and also allows the legacy computers and servers that are configured only with IPv4 addresses (but not with the IPv6 addresses) to be also supported by the proxies. For example, if a target computer supports the IPv6 protocol, then the proxy may establish an IPv6-based communications connection between the proxy and the target. However, if the target supports only the IPv4 protocol (but does not support the IPv6 protocol), then the proxy may establish an IPv4-based communications connection between the proxy and the target based on the IPv4 address of the proxy and the IPv4 address of the target.

The term "client" may be interpreted differently depending on a situation. In some situations, a client may correspond to a client computer. In some other situations, a client may correspond to a user application executing on a client computer. The significance of the different interpretations that may be assigned to the term "client" will be described later.

Identification-information of a client may be determined in a variety of ways. For example, if a username of the client uniquely identifies the client in the network in which the proxy is implemented, then the proxy may assign an IP address pair including an IPv6 address and an IPv4 address of the proxy to the username. However, if the username is not unique, but an IP address of the client computer is, then the proxy may assign an IP address pair including an IPv6 address and an IPv4 address of the proxy to the client's IP address.

However, if a client computer is a multi-user platform, then an IP address of the client computer may not uniquely identify a particular client supported by the client computer. In these situations, the client-identification-information may include not just an IP address of the client, but also a port ID of the port on which the proxy received the request from the client. Most likely a tuple including the IP address of the client and the proxy ID of the proxy's port will uniquely identify the client. In this example, the proxy may assign an IP address pair including an IPv6 address and an IPv4 address of the proxy to the tuple including the client's IP address and the proxy's port ID. Examples of different ways of determining the client-identification-information and assignments are in FIG. 1B-1D.

Assigning a pair of IP addresses, including an IPv6 address and an IPv4 address of the proxy, to identification-information of a client provides many benefits that are unavailable in conventional systems. In conventional systems, when a user tries to authenticate to a proxy, the proxy selects either one of its own IPv6 address or one of its own IPv4 address (but not both) and assigns the selected IP address to the client-identification-information. Hence, in the conventional systems, the association includes the client-identification-information and either an IPv6 address or an IPv4 address of the proxy, but not a pair of IP addresses including an IPv6 address and an IPv4 address of the proxy.

According to the present approach, depending on whether a target computer, to which the client attempts to connect, is configured with an IPv6 address or an IPv4 address, to connect with the target computer the proxy may use either its own IPv6 address or its own IPv4 address from the address pair already assigned to the client-identification information. This is performed without any need to redo or modify the already-created address association. Having two IP addresses, one of which is an IPv6 address and another is an IPv4 address of the proxy, both assigned to the identification-information, provides the proxy with the flexibility and efficiency in establishing either an IPv6-based connection or an IPv4-based connection with the target computer. The type of the connection depends on whether the target computer is configured with an IPv6 address or an IPv4 address.

Furthermore, having a pair with two IP addresses, one of which is an IPv6 address and another is an IPv4 address of the proxy, both assigned to the client-identification-information, provides the proxy with the flexibility and efficiency in establishing either an IPv6 based or an IPv4-based connection with the client without a need to modify the already-created address association.

According to the automated IPv6/IPv4 fallback approach, since an IP address pair, including an IPv6 address and an IPv4 address of the proxy, is assigned to the client-identification-information, the proxy may first proceed with an "optimistic approach," assume that the target computer is configured with an IPv6 address and attempt to establish an IPv6-based communications connection between the proxy and a target computer. However, if the target computer is configured only with an IPv4 address (but not with an IPv6 address), then the proxy, without a need to select its own new IPv4 address, may use the already selected IPv4 address that the proxy associated with the client-identification-information to establish an IPv4-based communications connection between the proxy and the target computer.

2.0. Examples of Proxy Networks

FIG. 1A is a diagram depicting an example proxy network in which some embodiments are implemented. As shown, a proxy network 100 includes one or more proxy servers 102. Proxy network 100 facilitates communications between a client computer 106 and a target computer 108 hosting, for example, a datacenter, a website, and the like.

In FIG. 1A, the arrows between the various components represent the directions in which network connections are initiated. The network connections may be established in conformance with the HTTP protocol, the SOCKS protocol, and the like. The type of the communications connections is not viewed as limiting the presented approach.

At a high level of abstraction, upon receiving a request from a user of client computer 106 to access target computer 108, proxy server 102 establishes a communications connection between proxy 102 and client computer 106 and a communications connection between proxy 102 and target computer 108, and then bridges both connections to facilitate communications between the user of client computer 106 and applications hosted by target computer 108.

If proxy 102 implements the SOCKS protocol, then a SOCKS proxy endpoint of proxy 102 initiates a network connection between proxy 102 and client computer 106, as indicated using an arrow 104A. Furthermore, the SOCKS endpoint of proxy 102 initiates a network connection with a SOCKS endpoint of target computer 108, as indicated by an arrow 104B. Once both connections are established, network packets can flow between client computer 106 to target computer 108 via proxy 102 in both directions. The network packet flow is not limited to the directions depicted by the arrows.

Proxy network 100 may be operated by a proxy service provider. For example, the proxy service provider may be a datacenter proxy service provider or a residential proxy service provider. Proxy network 100 may encompass many proxy endpoints in datacenters around the world. A purpose of the proxy provider is for the proxy provider to be able to offer to its users the ability to access target computers using network addresses registered in different countries or jurisdictions. This is useful to circumvent network firewall restrictions that prevent access to target computers by client computers that have a source network address registered in a prohibited or unauthorized country or geographic area.

For purposes of providing a clear example, FIG. 1A depicts only a single client computer 106 communicating with a single target computer 108 via proxy network 100. However, proxy network 100 can be used to connect many source computers to many target computers. Thus, client computer 106 is intended to be viewed as generally representative of many client computers, and target computer 108 is intended to be viewed as generally representative of many target computers.

In some embodiments, client computer 106 is an end-user personal computing device such as laptop computer, a desktop computer, a workstation computer, a tablet computing device, or a portable electronic computing device such as a smartphone. Client computer 106 could also be an application server computer or a network computing device and does not need to be an end-user personal computing device.

Target computer 108 is an application server computer or a network computing device configured to implement a website or other online services in conjunction with other target computers. More generally, no particular type of computing device or network device is required to implement client computer 106 or target computer 108.

Each of the computers implementing client computer 106, proxy 102, or target computer 108 may have assigned a registered network address. The registered network addresses may be assigned by a regional Internet registry such as the African Network Information Center (AFRINIC), the American Registry for Internet Numbers (ARIN), the Asia-Pacific Network Information Centre (APNIC), the Latin America and Caribbean Network Information Centre (LACNIC), and the Réseaux IP Européens Network Coordination Centre (RIPE NCC). Network address geolocation databases and services exist for resolving a given network address to the geographic region in which it is registered. The geographic region information provided by such databases and services for a given network address may be organized hierarchically. For example, a given network address may be registered in North America (continent), in the United States (country), in California (state/region), in San Francisco (city), and in postal code 94109. Target computer 108 may use such geolocation databases and services to block incoming network packets having a source network address that is not registered in a set of authorized geographic regions. For example, target computer 108 may block network packets with source network addresses registered in certain unauthorized geographic regions.

Target computer 108 may be part of a website that uses a network firewall to restrict access to the website to only source network addresses registered in the United States. In that case, if client computer 106 uses a network address registered in a European country, then client computer 106 may not directly connect to target computer 108. The network firewall would prevent the direct network connection because the source network address of the network connection is not registered in the United States. This problem may be solved using proxy network 100 because client computer 106 may access the website using proxy network 100.

Client computer 106 may access target computer 106 using proxy network 100 by establishing a communications connection with an endpoint of proxy 102. Since typically, the communications connection is established over a public network such as the Internet, the proxy endpoint may be used to secure the network connection and keep the contents of the information transmitted via the network connection hidden from other users and computers that have access to the public network.

As part of establishing a network connection, client computer 106 may specify, for example, a domain name, website name or other network address of a website of target computer 108 with which a user of client computer 106 wants to interact. In addition, client computer 106 may specify a target geographic area which may be a continent, country, city, region or state, or postal code.

The target geographic area may be used to select a network address to use as the network address of proxy 102 when proxy 102 connects and sends network packets to target computer 108. The selected network address is one registered in the target geographic area. For example, returning to the United States website example above, client computer 106 may specify the United States as the target geographic area. In this case, the network connection between proxy 102 and target computer 108 may use the source network address registered in the United States despite a source network address of client computer 106 being registered, for example, in Europe.

The above-described computer hardware and software are presented for purposes of illustrating the basic underlying components that may be employed in a proxy network. The present approach, however, is not limited to any particular proxy network configuration. The present approach may be implemented in any type of proxy network capable of supporting the methodologies of the described embodiments.

3.0. Extended Allocation Policy

Routing of IP packets between computers is usually facilitated using the IPv4 protocol or the IPv6 protocol, and thus based in either IPv4-type addresses or IPv6-type addresses, respectively. The different types of the IP packets are described in, for example, Internet Engineering Task Force (IETF) Request for Comments (RFC) 791 Internet Standard, September 1981 (informally referred to as IPv4), and IETF RFC 2460 Draft Standard, December 1998 (informally referred to as IPv6).

A proxy server may be configured to use its own IP addresses to mask the IP addresses of clients. For example, to mask a client IP address of client 106, proxy 102 may select an IPv6 address and an IPv4 address from its own pool of the IP addresses assigned to proxy 102 and assign the selected IP address pair to identification-information of the client.

Assignment of an IP address pair of the proxy to a client may be determined in a variety of ways. The correspondence between the client IP address and the IP address pair of the proxy may be captured using, for example, an association, a mapping, a connection state or status data, an authentication agreement, and the like.

3.1. IP Addresses of a Proxy

A proxy may have associated a plurality of IPv6 addresses and a plurality of IPv4 addresses assigned to the proxy in advance. Generally, IP addresses may be assigned to the proxy statically or dynamically. However, the process of assigning the IP addresses to the proxy is irrelevant to the disclosed approach; it is assumed herein that a pool of the IPv6 and IPv4 addresses has been already assigned to the proxy server.

Suppose that the proxy has a pool of IP addresses comprising several IPv6 addresses (including $IPv6_1$, $IPv6_2$, $IPv6_n$) and several IPv4 addresses (including $IPv4_1$, $IPv4_2$, IPv4$_m$). The addresses assigned to the proxy may be obtained from a Domain Name System (DNS) server or other entity.

3.2. Identification Information of a Client

Identification-information of a client may be determined in a variety of ways. The way of representing the identification-information of the client depends on the configuration of the client computer from which a request was sent to the proxy. Typically, the identification-information of the client is selected in such a way that it uniquely identifies the client in a multi-user, multi-application, and multi-user-groups configurations of the client computer.

In some embodiments, upon receiving a request from a client computer to authenticate to a proxy server, the proxy server may use the authentication credentials of the client sending the request. This approach is applicable if the authentication credentials (usually a username) of the proxy is unique within a network in which the client and the proxy are implemented.

According to another example, identification-information of a client may be determined based on an IP address of the client or the client computer. This approach is applicable if the IP address of the client or the client computer is unique within a network in which the client and the proxy are implemented.

According to yet another example, identification-information of a client may be determined based on a tuple including an IP address of the client or the client computer and a port identifier of a port on which the proxy received the request from the client. This approach is applicable if using the IP address of the client was insufficient to uniquely identify the client, but the tuple including the IP address of the client or the client computer and the port ID was sufficient.

3.3. Assigning a Pair of IP Addresses of a Proxy to a Username of a Client

Assigning a pair of IP addresses of a proxy to identification-information of a client trying to connect to a target computer via the proxy provides many benefits that are unavailable in conventional systems. In the conventional systems, when a user tries to authenticate to a proxy, the proxy selects either its own IPv4 address or its own IPv6 address and assigns the selected IP address to the identification-information of the client. Hence, in the conventional systems, the association includes the identification-information of the client and only one IP address of the proxy (either an IPv4 address or an IPv6 address of the proxy), but it does not include two addresses (i.e., both an IPv6 address and an IPv4 address of the proxy).

In sharp contrast, the association according to the present approach includes, in addition to identification-information, two IP addresses of the proxy: a selected IPv6 address of the proxy and a selected IPv4 address of the proxy. By selecting both the IPv6 address and the IPv4 address of the proxy in advance, the proxy can later use either address to connect to a target computer, which may be configured with either an IPv6 address or an IPv4 address. Depending on the configuration of the target computer to which the proxy attempts to connect, the proxy may use any of its own two selected IP addresses to seamlessly connect to the target computer. Having two IP addresses, one of which is an IPv6 address and another is an IPv4 address of the proxy, assigned to the identification-information of the client provides the proxy with the flexibility and efficiency in establishing a connection with the target computer and bridging the communications between the client computer and the target computer.

One way of determining identification-information for a client is using a username of a client that tries to connect to a proxy from the client computer. The proxy may receive an authentication request from the client as the client attempts to establish a communications connection between the client and the proxy. The authentication request may include a username and user password. If the provided username is unique within a network in which the proxy and the client are implemented, then the proxy may associate the username with an IP address pair of the proxy selected from a pool of the proxy addresses. One of the addresses of the pair is the proxy IPv6 address and the other is the proxy IPv4 address.

Suppose that the proxy has an associated pool of IP addresses, including IPv6 addresses and the IPv4 addresses. Suppose that the proxy pairs the IPv6 addresses with the corresponding IPv4 addresses of the proxy. The pairs may include the following: [IPv6$_1$, IPv4$_1$], [IPv6$_2$, IPv4$_2$], [IPv6$_n$, IPv4$_n$].

FIG. 4 is a flow chart depicting an example implementation of an extended allocation policy according to some embodiments. The steps depicted in FIG. 4 may be performed by an application or a module of proxy 102.

In step 402, a proxy receives a request from a client to connect to a target computer. The manner in which the request is sent from the client to the proxy is irrelevant to this approach; the request may be sent using any communications protocol.

In step 404, the proxy determines identification-information of the client that sent the request. The identification-information of the client needs to uniquely identify the client in a computer network in which the client and the proxy are implemented. The examples of the identification-information include a username of the client, an IP address of the client, and a tuple including an IP address of the client and a port identifier of a port on which the proxy received the request from the client. In some embodiments, the proxy first tries to determine whether the username is unique within the computer network.

If, in step 406, the proxy determines that the username of the client is unique within the computer network, then the proxy performs step 408, in which the proxy assigns, to the username of the client, an IP address pair including an IPv6 address and an IPv4 address of the proxy. An example assignment is depicted in FIG. 1B.

Figure 1B:
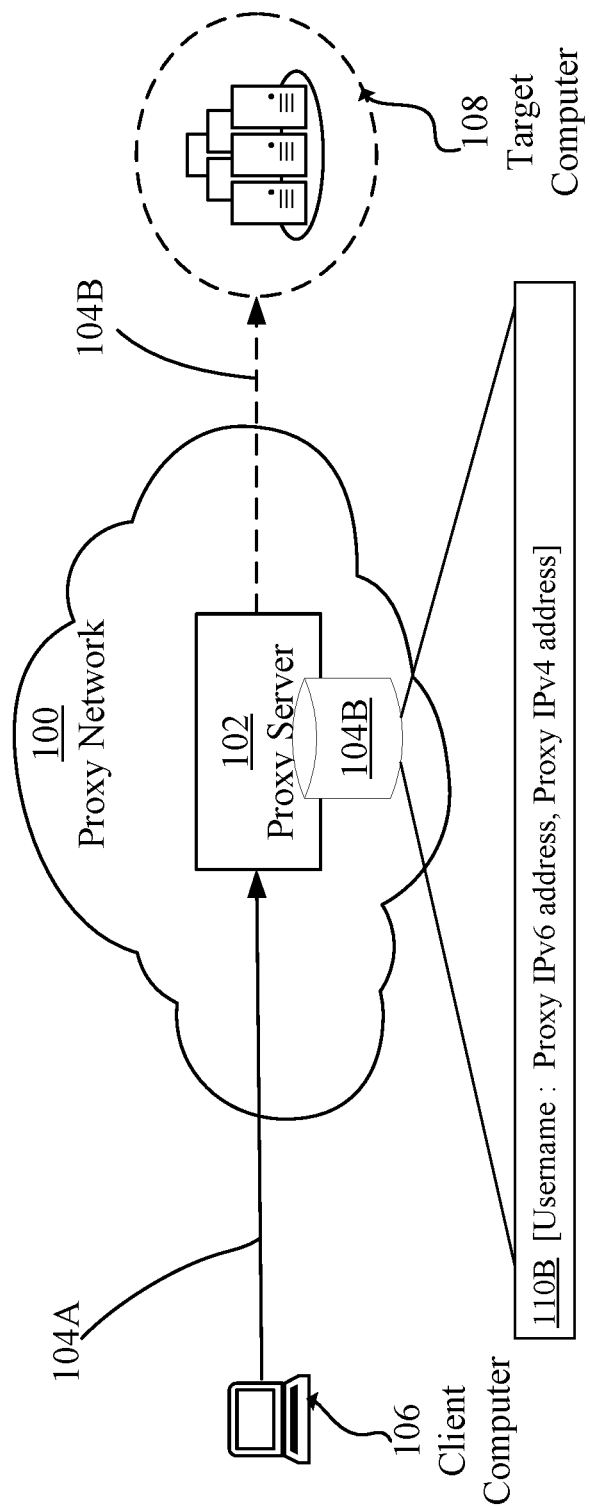
FIG. 1B is a diagram depicting an example address allocation according to some embodiments.

FIG. 1B is a diagram depicting an example address allocation according to some embodiments. In the depicted example, according to the extended allocation policy, proxy 102 assigns a pair of IP addresses of the proxy to a username of client executing on client computer 106. The username is obtained from the authentication credentials of the client or a user supported by client computer 106. Suppose that the authentication credentials included a username and a user password. If the username is sufficiently unique, then just the username may be used in the association. If the username is not sufficiently unique, then both the username and the user password may be used as the identification-information.

Suppose that the proxy selects from its pool of its own IP addresses, an IPv6 address and an IPv4 address. In this example, proxy 102 assigns the pair of IP addresses of the proxy to the client's username as follows:

[Username:Proxy IPv6address,Proxy IPv4address]. (4)

An above association 110B may be stored in memory of proxy 102 or a database 104B of proxy 102.

Therefore, upon receiving, by proxy 102, the request from the client having the username and being supported by client computer 106, proxy 102 may use its own IPv6 address or its own IPv4 address to establish a communications connection (either an IPv6-based or an IPv4-based) with client computer 106. More specifically, if client computer 106 is configured with an IPv6 address, then proxy 102 may establish a communications connection with the client computer using the IPv6 address of the proxy and the IPv6 address of client computer 106. However, if client computer 106 is not configured with an IPv6 address, but is configured with an IPv4 address, then proxy 102 may establish a communications connection with the client computer using the IPv4 address of the proxy and the IPv4 address of client computer 106. Different ways of establishing a communications connection between proxy 102 and client computer 106 are described later.

Depending on whether target computer 108 is configured with an IPv6 address or an IPv4 address, proxy 102 may attempt to establish either an IPv6-based connection or an IPv4-based connection with target 108. To establish an IPv6-based connection, proxy 102 uses its own IPv6 address (selected from the IP address pair assigned to the client's username) and an IPv6 address (if available) of target computer 108. If establishing of the IPv6-based connection fails, then proxy 102 may attempt to establish an IPv4-based connection using its own IPv4 address and an IPv4 address (if available) of target computer 108.

Referring again to FIG. 4, if in step 406, the proxy determines that a username of a client executing on client computer 104 is not unique in a computer network in which the proxy, the client and the target are implemented, then the proxy proceeds to step 410.

In step 410, the proxy determines whether an IP address of the client is unique in a computer network in which the proxy, the client and the target are implemented.

3.4. Assigning a Pair of Ip Addresses of a Proxy to an Ip Address of a Client

Another way of determining identification-information of a client is based on an IP address of the client computer from which the client/user is trying to access the proxy.

Referring again to FIG. 4, if, in step 410, the proxy determines that an IP address of the client or client computer 106 is unique within the computer network, then the proxy performs step 412, in which the proxy assigns, to the IP address of the client, an IP address pair including an IPv6 address and an IPv4 address of the proxy. An example assignment is depicted in FIG. 1C.

Figure 1C:
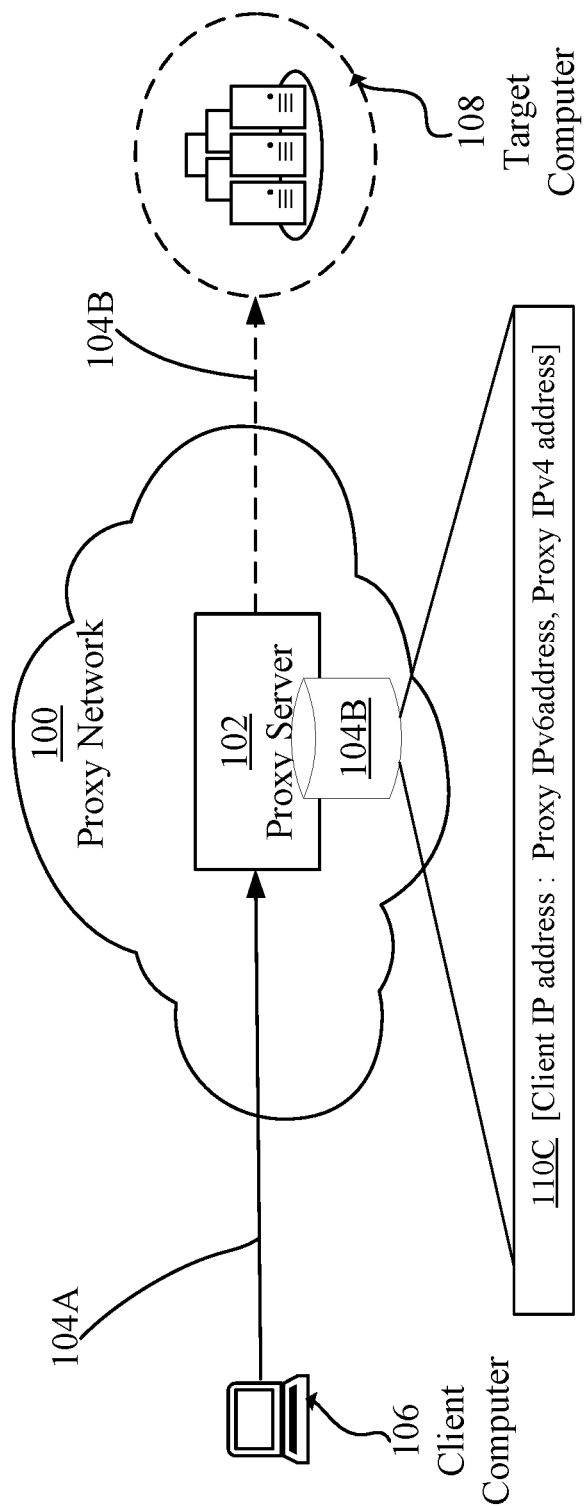
FIG. 1C is a diagram depicting an example address allocation according to some embodiments.

FIG. 1C is a diagram depicting an example address allocation according to some embodiments. In the depicted example, according to the extended allocation policy, proxy 102 assigns a pair of IP addresses of the proxy to an IP address of the client or client computer 106.

Suppose that the proxy selects from its pool of its own IP addresses, an IPv6 address and an IPv4 address. In this example, proxy 102 assigns the pair of IP addresses of the proxy to the client's IP address as follows:

[IP address of client:Proxy IPv6address,Proxy
 IPv4address].                                              (5)

An above association 110C may be stored in memory of proxy 102 or a database 104B of proxy 102.

Therefore, upon receiving, by proxy 102, the request from the client having the client's IP address and being supported by client computer 106, proxy server 102 may use its own IPv6 address or its own IPv4 address to establish a communications connection (either an IPv6-based or an IPv4-based) with client computer 106. More specifically, if client computer 106 is configured with an IPv6 address, then proxy 102 may establish a communications connection with the client computer using the IPv6 address of the proxy and the IPv6 address of client computer 106. However, if client computer 106 is not configured with an IPv6 address, but is configured with an IPv4 address, then proxy 102 may establish a communications connection with the client computer using the IPv4 address of the proxy and the IPv4 address of client computer 106.

Depending on whether target computer 108 is configured with an IPv6 address or an associated IPv4 address, proxy 102 may attempt to establish either an IPv6-based connection or an IPv4-based connection with target 108. To establish an IPv6-based connection, proxy 102 uses its own IPv6 address (selected from the IP address pair assigned to the identification-information of the client) and an IPv6 address (if available) of target computer 108. If establishing of the IPv6-based connection fails, then proxy 102 may attempt to establish an IPv4-based connection using its own IPv4 address and an IPv4 address (if available) of target computer 108.

Referring again to FIG. 4, if in step 410, the proxy determines that an IP address of a client executing on client computer 104 is not unique in a computer network in which the proxy, the client and the target are implemented, then the proxy proceeds to step 414, described below.

3.5. Assigning a Pair of Ip Addresses of a Proxy to a Tuple

Another way of determining identification-information of a client is based on a tuple including an IP address of the client computer from which the user/client is trying to access the proxy and a port identifier of a port of the proxy on which the proxy received the access request. A typical proxy may have about 65,000 different ports, which currently is more than needed since the proxy typically uses only about 20,000 ports of the 65,000 that are available. Hence, most likely, a tuple including the client IP address and the proxy port identifier of the port on which the proxy received the client's access request uniquely identifies the client. In this example, the proxy may associate a tuple, including the IP address of the client computer and the port identifier, with a pair of the IP addresses of the proxy selected from a pool of the proxy addresses, wherein one address in the pair is the proxy IPv6 address, and the other address in the pair is the proxy IPv4 address.

Referring again to FIG. 4. If in step 414, the proxy determines that a tuple including an IP address of the client or client computer 106 and the port identifier of the port on which the proxy received the request from the client is unique, then the proxy proceeds to step 416. Otherwise, the proxy may report an error in step 414A.

In step 416, the proxy assigns, to a tuple including the IP address of the client and the port identifier of the port on which the proxy received the request from the client, an IP address pair including an IPv6 address and an IPv4 address of the proxy. An example assignment is depicted in FIG. 1D.

Figure 1D:
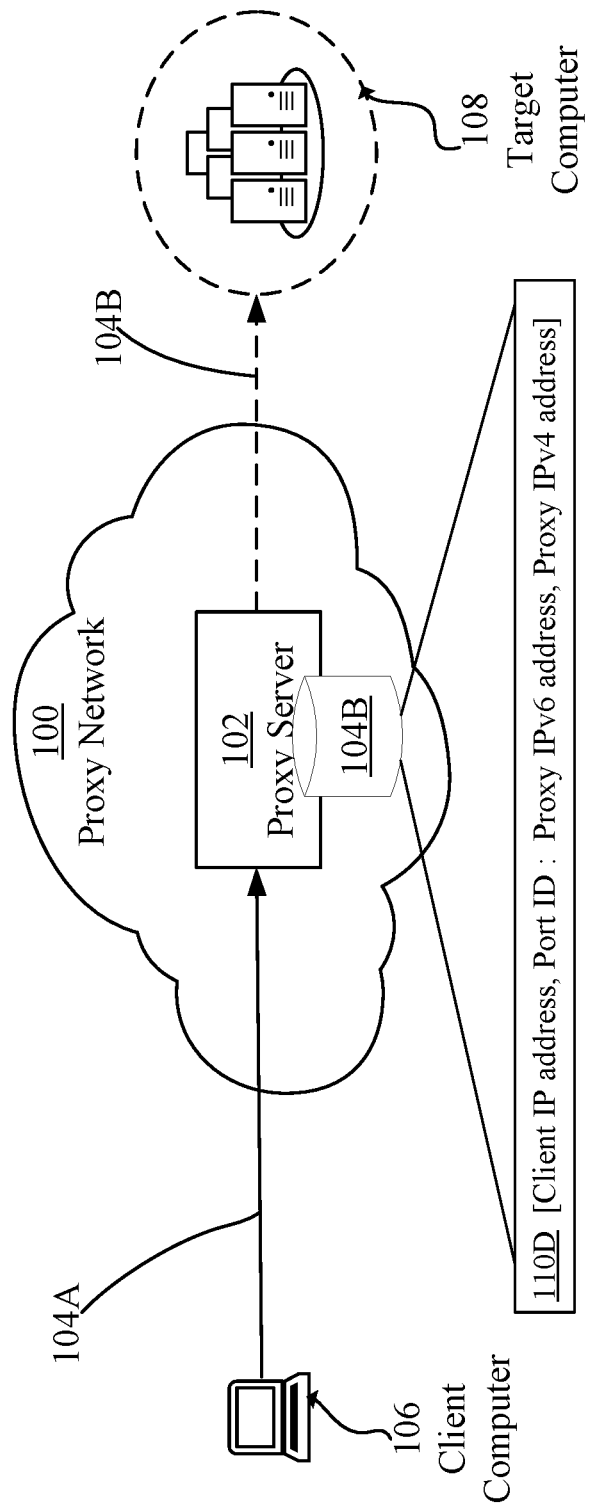
FIG. 1D is a diagram depicting an example address allocation according to some embodiments.

FIG. 1D is a diagram depicting an example address allocation according to some embodiments. In the depicted example, according to the extended allocation policy, proxy 102 assigns a pair of IP addresses of the proxy to a tuple including an IP address of client 106 and a port identifier of the proxy's port on which the proxy received the request from the client.

Suppose that the proxy selects from its pool of its own IP addresses, an IPv6 address and an IPv4 address. In this example, proxy 102 assigns the pair of IP addresses of the proxy to the tuple as follows:

[IP address of client,Port ID:Proxy IPv6address,
 Proxy IPv4address].                                       (6)

An above association 110D may be stored in memory of proxy 102 or a database 104B of proxy 102.

Therefore, upon receiving, by proxy 102, on the proxy's port, the request from the client having the client's IP address, proxy server 102 may use its own IPv6 address or its own IPv4 address to establish a communications connection (either an IPv6-based or an IPv4-based) with client computer 106. More specifically, if client computer 106 is configured with an IPv6 address, then proxy 102 may establish a communications connection with the client computer using the IPv6 address of the proxy and the IPv6 address of client computer 106. However, if client computer 106 is not configured with an IPv6 address, but is configured with an IPv4 address, then proxy 102 may establish a communications connection with the client computer using the IPv4 address of the proxy and the IPv4 address of client computer 106.

Depending on whether target computer 108 is configured with an IPv6 address or an IPv4 address, proxy 102 may attempt to establish either an IPv6-based connection or an IPv4-based connection with target 108. To establish an IPv6-based connection, proxy 102 uses its own IPv6 address (selected from the IP address pair assigned to the identification-information of the client) and an IPv6 address (if available) of target computer 108. If establishing of the IPv6-based connection fails, then proxy 102 may attempt to establish an IPv4-based connection using its own IPv4 address and an IPv4 address (if available) of target computer 108.

4.0. Establishing a Virtual Connection Between a Client and a Target Utilizing an Extended Allocation Policy In the examples described below, references are made to a fictitious domain, referred to as a DOMAIN.COM. That domain may be hosted by a fictitious target computer and may correspond to any actual domain in which the presented approach is implemented.

4.1. Querying a DNS Server for IP Addresses of a Target Computer

Figure 5:
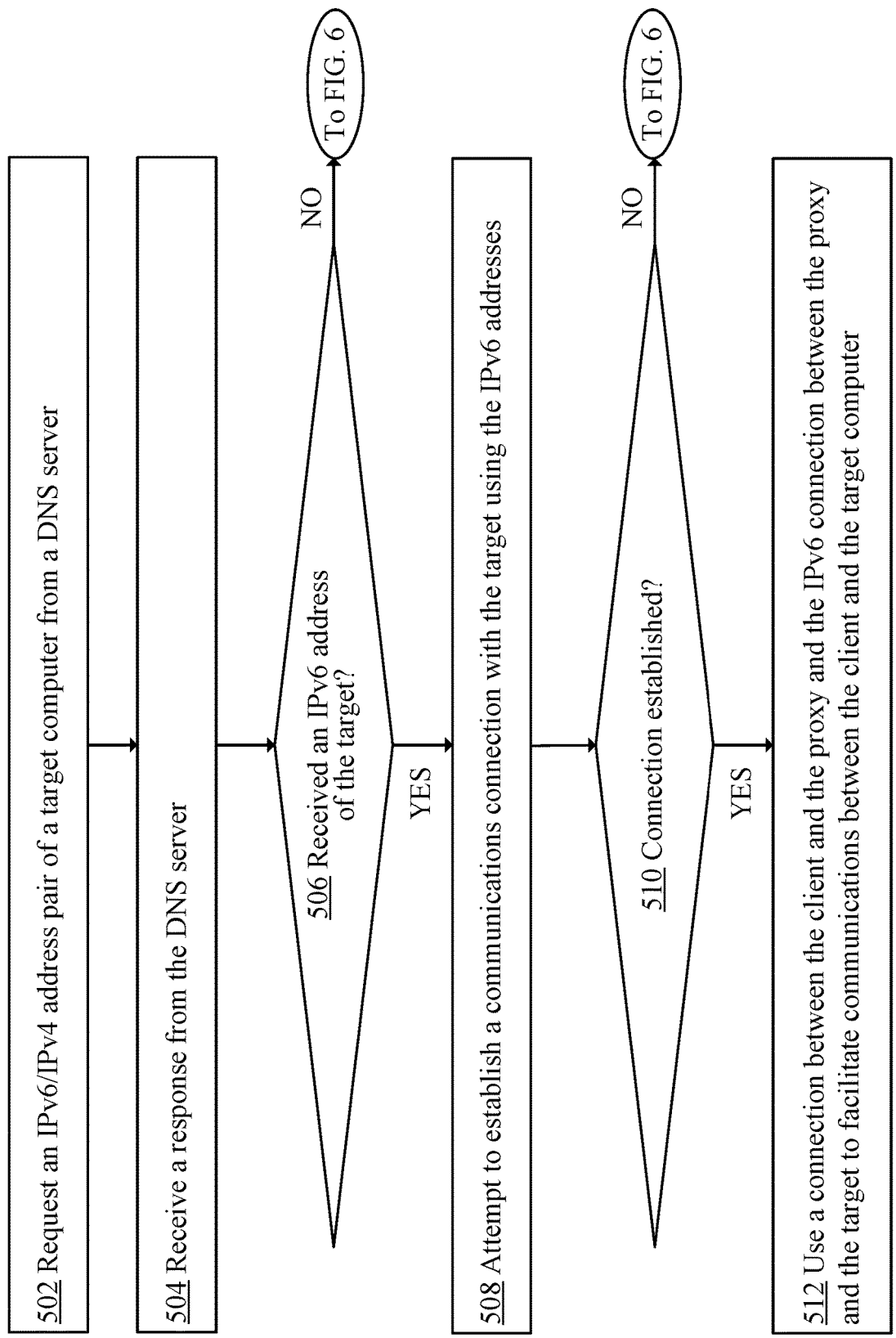
FIG. 5 is a flow chart depicting an example implementation of an automated IPv6/IPv4 fallback approach in a proxy network according to some embodiments.

FIG. 5 is a flow chart depicting an example implementation of an automated IPv6/IPv4 fallback approach in a proxy network according to some embodiments. The steps described in FIG. 5 may be performed by an application or a module executing on proxy server 102.

Suppose that a client was successfully authenticated to a proxy and an association between the client's identification-information and a pair of IPv6 and IPv4 addresses of the proxy was created. Further, suppose that a request was received from the client to communicate with the target computer hosting, for example, a DOMAIN.COM. In response to receiving the request, the proxy tries to establish a communications connection with the target.

In step 502, upon receiving the request from the client to communicate with the target computer, the proxy requests an IPv6/IPv4 address pair of the target computer from a DNS server. A DNS server is typically responsible for handling the namespaces of the Internet domains to resolve IP address(es) for the DOMAIN.COM. The DNS servers may perform a translation (resolution) of human-memorable domain names (such as, for example, DOMAIN.COM) and hostnames into the corresponding numeric Internet Protocol (IP) addresses (such as, for example, IPv4 addresses and/or IPv6 addresses). Sending the request from the proxy to the DNS server is illustrated in FIG. 2A.

Figure 2A:
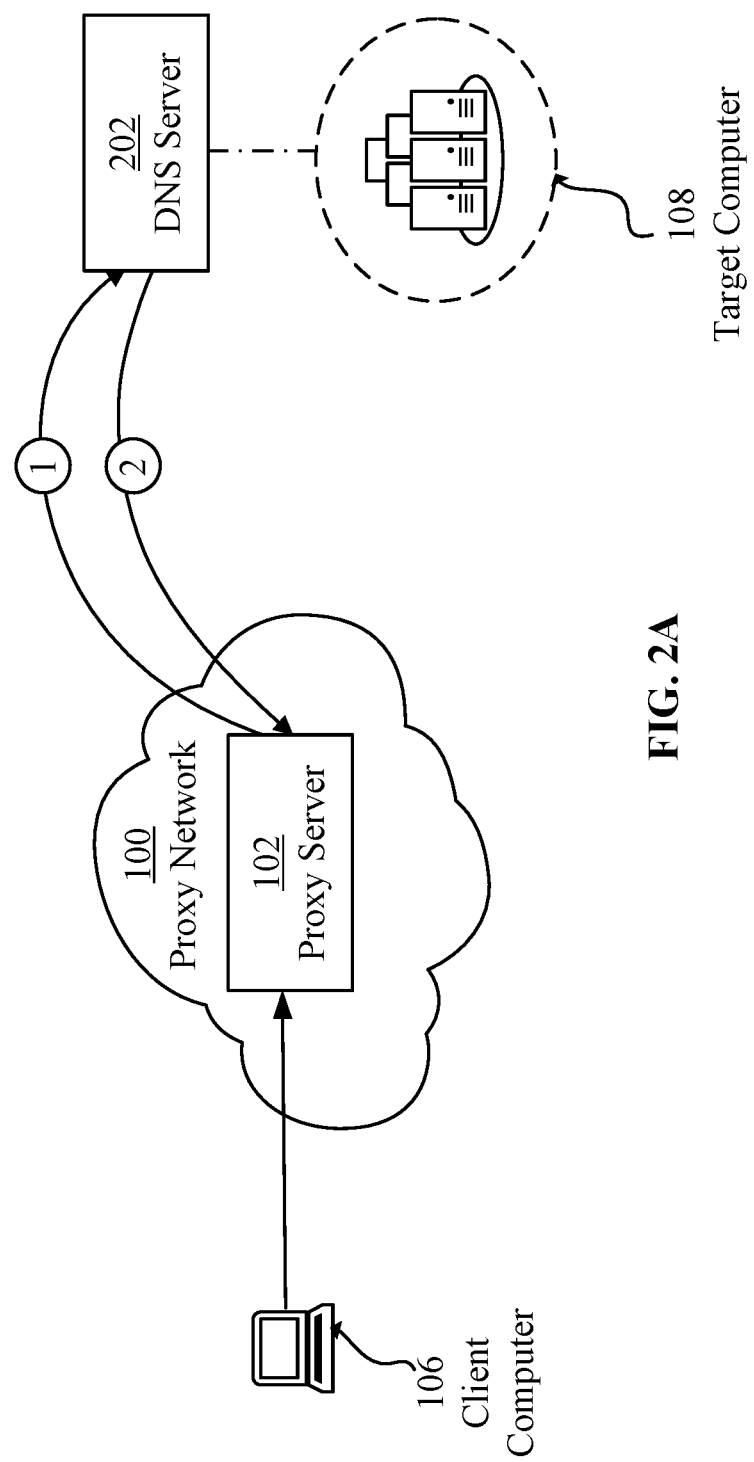
FIG. 2A is a diagram depicting an example address resolution according to some embodiments.

FIG. 2A is a diagram depicting an example address resolution according to some embodiments. In FIG. 2A, proxy server 102 sends ("1") a request to a DNS server 202 requesting an IPv6/IPv4 address pair of target computer 108.

Continuing with the above example, upon sending the request to resolve the IP addresses for the DOMAIN.COM to the DNS server, the proxy may receive ("2") an IPv4 address of the DOMAIN.COM, or an IPv6 address of the DOMAIN.COM, or both, the IPv4 and the IPv6 addresses of the DOMAIN.COM. The types of addresses and the count of addresses that are provided by the DNS server for the DOMAIN.COM to the proxy depend on the configuration parameters of the target computer and the information stored at the DNS server.

Referring again to FIG. 5, in step 504, the proxy receives the IP address(es) of target computer 108.

In some situations, however, even if the DNS server provided a pair of the IP addresses of the target computer, i.e., an IPv4 address and an IPv6 address of target 108, to the proxy, the target computer itself may be configured only with one of the two addresses, but not with both. It is more desirable that the target computer is configured at least with an IPv6 address because the IPv6 address space offers a larger range of the IP addresses than the IPv4 address space. Thus, the IPv6 address space offers better scalability than the IPv4 address space. However, some legacy domains may still be configured only with the IPv4 addresses.

4.2. IPv6-Based Approach

Upon receiving a pair of the IP addresses, at least one IP address, of the target computer from the DNS server, in step 506, the proxy determines whether an IPv6 address of the DOMAIN.COM hosted on target computer 108 was provided. If it was, then the proxy proceeds to perform step 508. Otherwise, the proxy proceeds to perform the steps described in FIG. 6.

Referring again to FIG. 5, in step 508, the proxy applies an "optimistic" approach and uses first an IPv6 address of the target computer, not an IPv4 address, from the IP address(es) provided by the DNS server for target computer 108 to establish a communications connection between the proxy and the target computer. In this process, the proxy may use an IPv6 address of the proxy assigned to the identification-information of the client in the IP address pair, as described above. The objective of the new technology is to utilize the IPv6 addresses as often as possible.

To initiate the process of establishing a communications connection between the proxy and the target computer, the proxy may use the Transmission Control Protocol (TCP) three-way-handshake process. An example process is described in FIG. 2B (steps 3, 4 and 5).

Figure 2B:
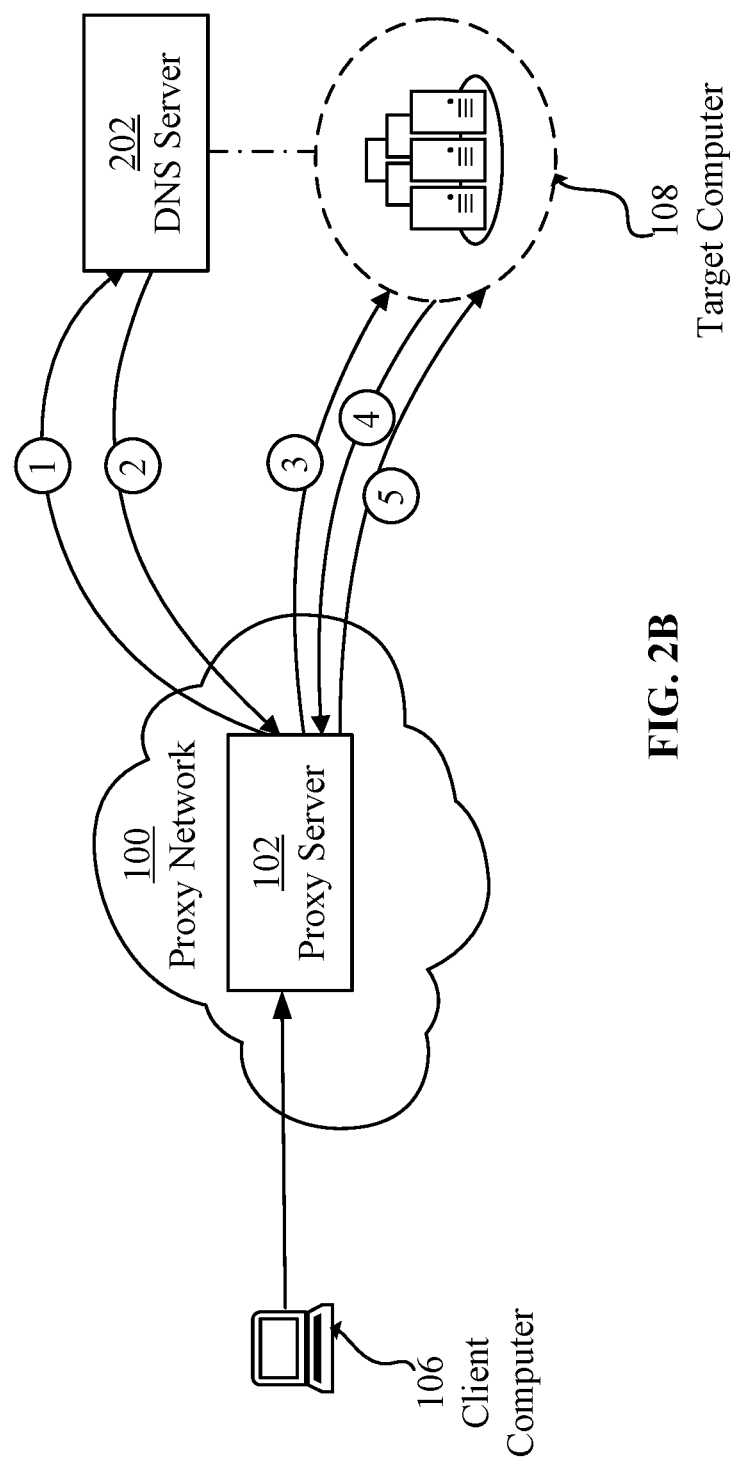
FIG. 2B is a diagram depicting establishing an IPv6-based communications connection according to some embodiments.

FIG. 2B is a diagram depicting establishing an IPv6-based communications connection according to some embodiments. As shown in FIG. 2B, the proxy sends ("3"), using its own IPv6 address and the IPv6 address of the target computer, a segment having a Synchronize Sequence Number (SYN) from the proxy to the target computer. If the target computer is indeed configured with the IPv6 address, then upon receiving the SYN segment, the target computer may respond ("4") to the proxy with a SYN/ACK segment, to which the proxy may respond ("5") with an Acknowledgment (ACK).

Referring again to FIG. 5, if, in step 510, the proxy determines that all communications 3-4-5 were successfully exchanged between the proxy and the target computer, then an IPv6-based connection between the proxy and the target computer is established. Otherwise, the proxy proceeds to perform the steps described in FIG. 6.

If the communications connection between the proxy and the target computer was successfully established, then, in step 512, the proxy uses the already-established connection between the proxy and the client computer, and the IPv6- based connection established between the proxy and the target computer to facilitate communications between the client and the target computer. The connection between the proxy and the client computer may be either IPv6-based connection or an IPv4-based connection, as described before.

Figure 2C:
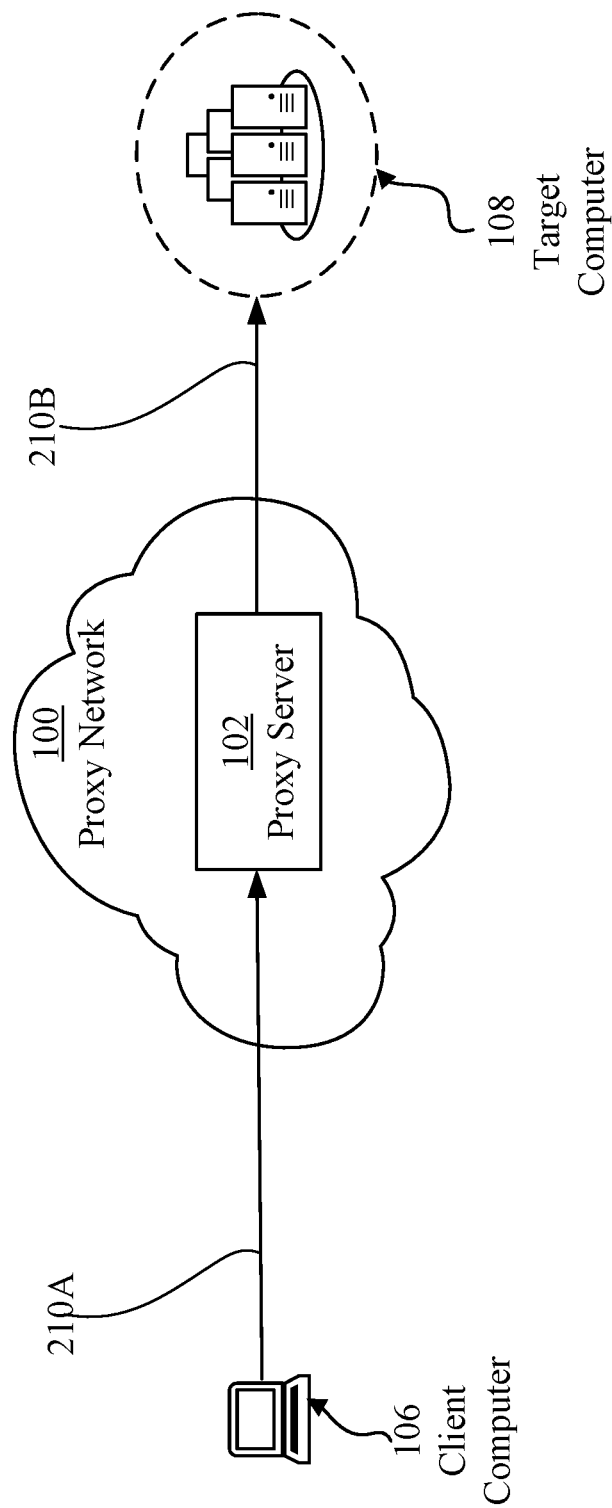
FIG. 2C is a diagram depicting communications connections between a client and a target according to some embodiments.

FIG. 2C is a diagram depicting communications connections between a client and a target according to some embodiments. In the depicted example, a communications connection 210A is established between client computer 106 and proxy 102, while an IPv6-based communications connection 210B is established between proxy 102 and target computer 108.

4.3. Fallback IPv4 Approach

However, if the target computer is not configured with an IPv6 address, then the target computer may not receive the SYN segment from the proxy or may be unable to respond with the SYN/ACK to the proxy. Thus, the attempt to establish the communications with the target computer using the IPv6 addresses would fail. The IPv6-based connection may also fail if the attempts to establish the connection times out. In this case, the proxy may apply the fallback approach. The fallback approach is also applied when an IPv6 address of the target computer was not provided to the proxy by the DNS server. The fallback approach is described in FIG. 6 and FIG. 3A-3B.

According to the fallback approach, a proxy may attempt to use an IPv4 address of the proxy (taken from an IP address pair assigned to identification-information of a client) and the IPv4 address of the target computer to establish an IPv4-based communications connection between the proxy and the target computer. To do so, the proxy may use the TCP three-way-handshake approach. If the target computer is indeed configured with an IPv4 address, then the proxy may establish an IPv4-based communications connection with the target computer. Then the proxy may use the connection between the client computer and the proxy and the IPv6 connection between the proxy and the target to facilitate communications between the client and the target. The fallback approach is described in FIG. 6 and FIG. 3A-3B.

Figure 6:
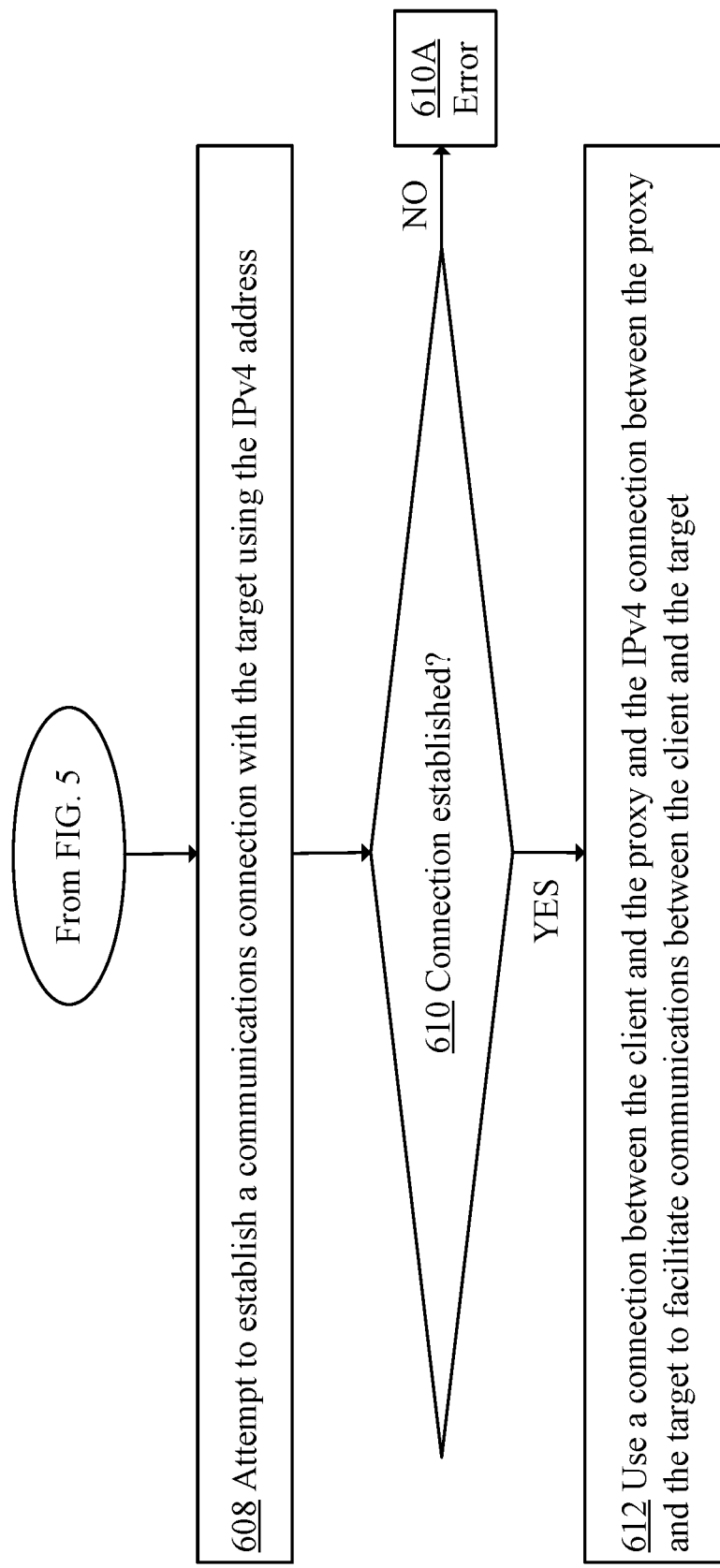
FIG. 6 is a flow chart depicting an example implementation of an automated IPv6/IPv4 fallback approach in a proxy network according to some embodiments.

Referring first to FIG. 6, if the proxy was unable to establish an IPv6-based connection with the target computer for some reason, then in step 608, the proxy attempts to establish an IPv4-based communications connection between the proxy and the target computer. An example process is described in FIG. 3A.

Figure 3A:
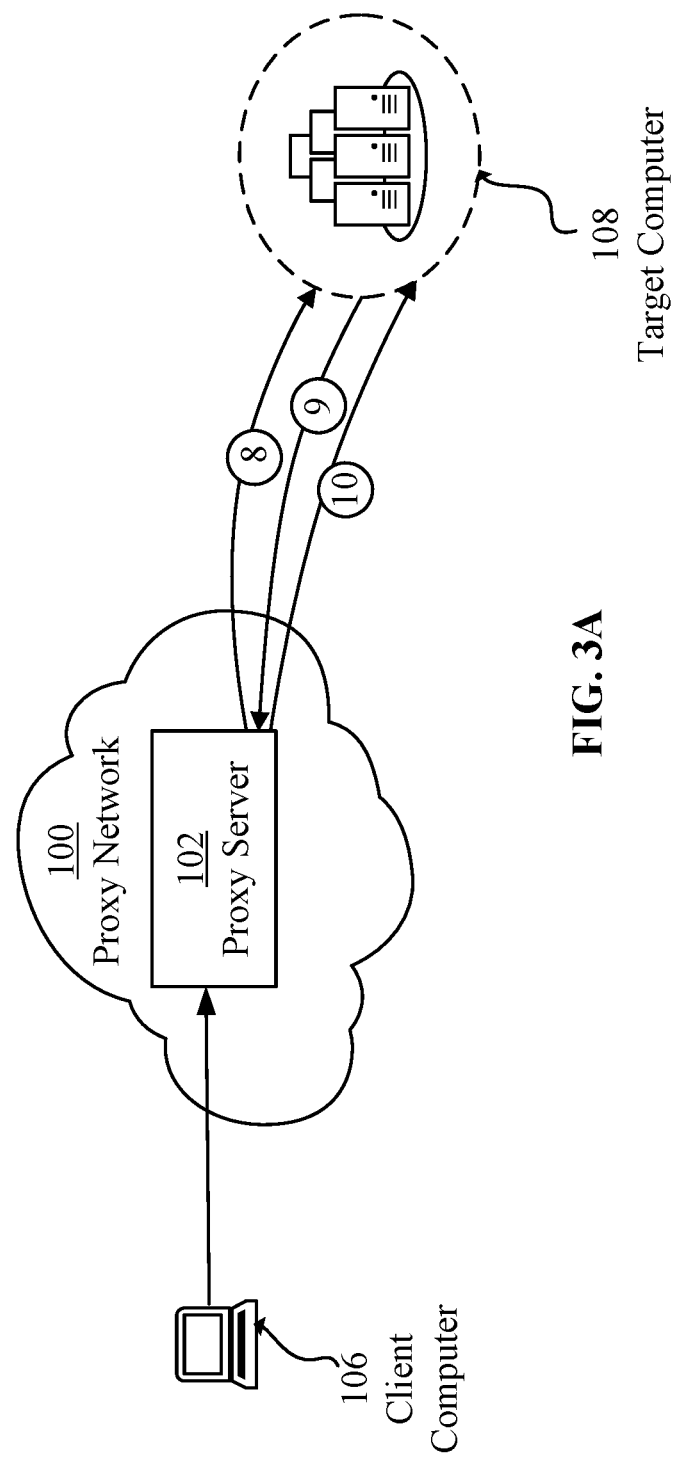
FIG. 3A is a diagram depicting establishing an IPv4-based communications connection according to some embodiments.

FIG. 3A is a diagram depicting establishing an IPv4-based communications connection according to some embodiments. In FIG. 3A, proxy server 102 sends ("8"), using its own IPv4 address and the IPv4 address of the target computer, a segment having a Synchronize Sequence Number (SYN) from the proxy to the target computer. If the target computer is indeed configured with the IPv4 address, then upon receiving the SYN segment, the target computer may respond ("9") to the proxy with a SYN/ACK segment, to which the proxy may respond ("10") with an ACK.

Referring now to FIG. 6, if, in step 610, the proxy determines that all communications 8-9-10 were successfully exchanged between the proxy and the target computer, then an IPv4-based connection between the proxy and the target computer is established. Otherwise, the proxy may generate and output an error message 610A.

If the IPv4-based communications connection between the proxy and the target computer was successfully established, then, in step 612, the proxy uses the already-established connection between the proxy and the client computer, and the IPv4-based connection established between the proxy and the target computer to facilitate communications between the client and the target computer. The connection between the proxy and the client computer may be either IPv6-based connection or an IPv4-based connection, as described before.

Figure 3B:
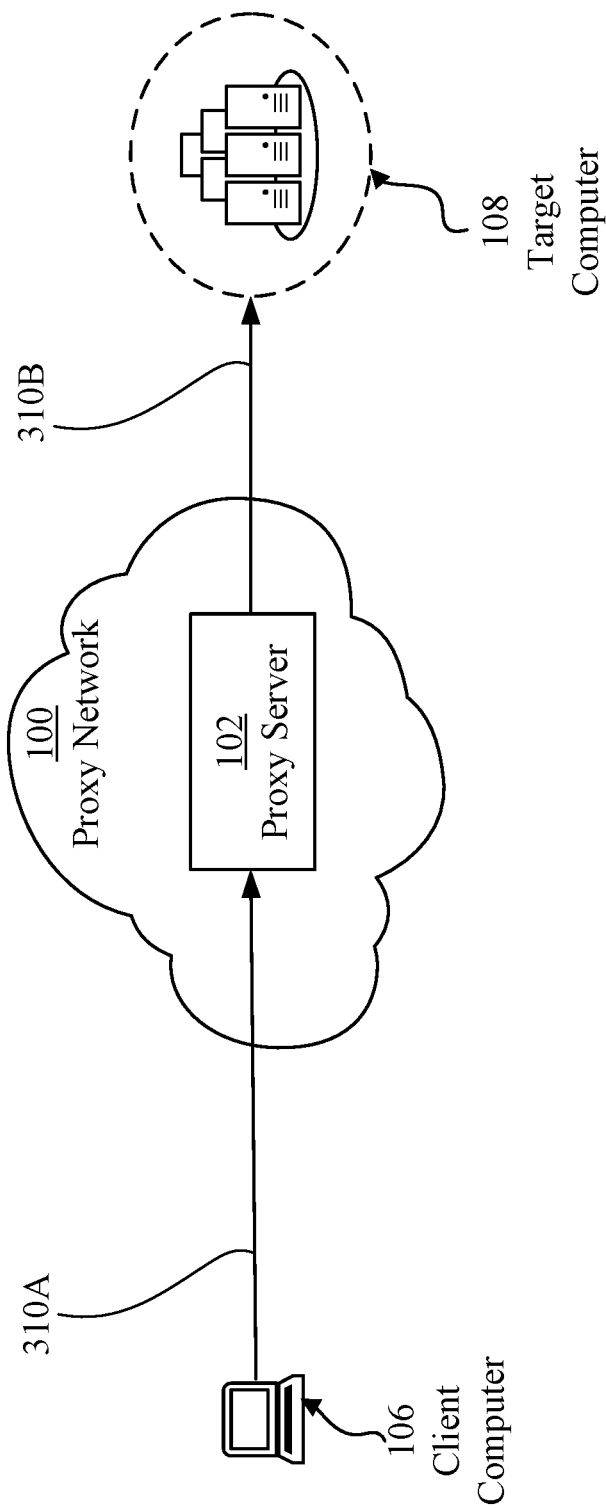
FIG. 3B is a diagram depicting communications connections between a client and a target according to some embodiments.

FIG. 3B is a diagram depicting communications connections between a client and a target according to some embodiments. In the depicted example, a communications connection 310A is established between client computer 106 and proxy 102, while an IPv4-based communications connection 310B is established between proxy 102 and target computer 108.

5.0. Improvements Provided by Certain Embodiments

In some embodiments, the extended allocation policy presented herein provides flexible mechanisms for assigning an IP address pair, including an IPv6 address and an IPv4 address of the proxy, to identification-information of a client. The IP address pair of the proxy is assigned to the identification-information of the client in the same assigning step, and thus it is readily-available to the proxy when the proxy needs to establish either an IPv6-based connection or an IPv4-based connection with another computer. In sharp contrast, the conventional approaches assign only one IP address of the proxy to the identification-information of the client.

The client's identification-information may be determined based on the user credentials provided to the proxy when the client attempts to authenticate to the proxy. The credentials may be expressed as just a username, or just a password, or as both the username and the password. However, if the proxy assigns the same password to all users, then the unique identification-information of the client may correspond to the username of the client since the password itself does not contribute to the uniqueness of the user-identification-information.

In some embodiments, an IP address of the client computer from which a client requested access to the proxy is used as identification-information of the client, and subsequently part of an association between the identification-information and an IP address pair of the proxy.

In some embodiments, an IP address of the client computer from which a client requested access to the proxy and a port identifier of the port on which the proxy received the request from the user is used as identification-information of the client and is paired with an IP address pair of the proxy.

If the target computer is configured with the IPv6 address, then the proxy attempts to establish an IPv6-based connection with the target computer. To establish the IPv6-based connection with the target computer, the proxy uses its own IPv6 address, included in an IP address pair of the proxy assigned to identification-information of the client, and an IPv6 address of the target computer provided by a DNS server.

If, however, the target computer is not configured with the IPv6 address or establishing an IPv6-based connection with the target failed, then the proxy attempts to establish an IPv4-based connection with the target. To establish the IPv4-based connection with the target, the proxy uses its own IPv4 address, included in an IP address pair of the proxy assigned to identification-information of the client, and an IPv4 address of the target computer provided by a DNS server.

6.0. Hardware Implementation

According to some embodiments of the present approach, the techniques described herein are implemented by at least one computer system. The techniques may be implemented in whole or in part using a combination of at least one server computer or other computer systems that are coupled using a network, such as a packet data network. The computer systems may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computer systems may also combine custom hard-wired logic, ASICs, or FPGAs with custom programming to accomplish the described techniques.

The computer systems may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired or program logic to implement the described techniques, one or more virtual computing machines or instances in a data center, or a network of server computers or personal computers.

Figure 7:
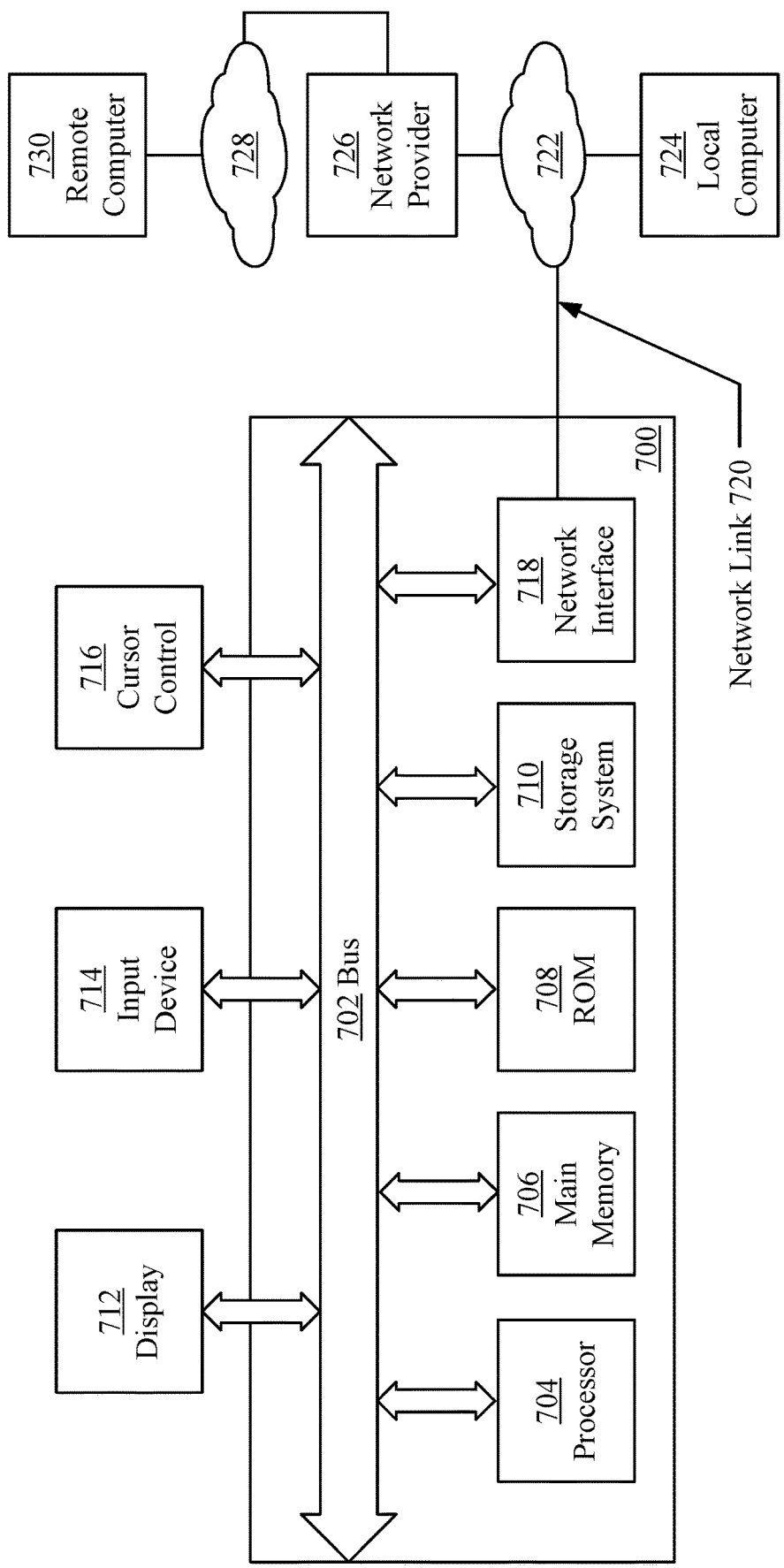
FIG. 7 is a block diagram depicting a computer system upon which some embodiments may be implemented.

FIG. 7 is a block diagram that illustrates an example computer system with which some embodiments may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus or other communication mechanism(s) for communicating information or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 700 may be coupled via I/O subsystem 702 to at least one output device 712. In some embodiments, output device 712 is a digital computer display. Examples of a display that may be used in some embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators, or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In some embodiments, computer system 700 may comprise an internet of things (IoT) device in which one or more of the output devices 712, input device 714, and control device 716 are omitted. In some embodiments, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator, or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware or program instructions or logic which when loaded and used or executed in combination with the computer system causes or programs the computer system to operate as a special-purpose machine. According to some embodiments, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In some embodiments, hard-wired circuitry may be used in place of or in combination with software instructions.

The term "storage media" as used herein refers to any non-transitory media that store data or instructions that cause a machine to operate in a specific fashion. Such storage media may comprise non-volatile media or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, inter-network, or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Communication interface 718 can be based on an interconnect technology used for distributed computing systems, supercomputer systems, and high-performance computing systems. For example, communication interface 718 can be based on OMNI-PATH, INFINIBAND, ARIES, NVLINK, TOFU, or ethernet.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices or computers that are operated by an Internet Service Provider (ISP) 726. ISP 726 provides data communication services through a world-wide packet data communication network represented as internet 728.

A server computer 730 may be coupled to internet 728. Server 730 broadly represents any computer, data center, virtual machine, or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or NoSQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, or stored in storage 710, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In some embodiments, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In some embodiments, for security and reliability, an operating system may prevent direct communication between independent processes, providing strictly mediated and controlled inter-process communication functionality.

7.0. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage, or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers, or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A computer system comprising:
one or more computer processors;
storage media; and
instructions stored in the storage media that, when executed by the one or more computer processors, cause the one or more computer processors to perform:
receiving, at a proxy server of a plurality of proxy servers, a request from a client executing on a client computer for access to a target computer;
requesting one or more IP addresses of the target computer from a Domain Name System (DNS) server;
upon receiving the one or more IP addresses of the target computer, determining whether the one or more IP addresses include an IPv6 address of the target computer;
in response to determining that the IPv6 address of the target computer is included in the one or more IP addresses of the target computer:
determining whether the plurality of proxy servers includes an IPv6 proxy server configured to handle IPv6 communications;
in response to determining that the plurality of proxy servers includes the IPv6 proxy server:
selecting an IPv6 address of the IPv6 proxy server from a pool of IP addresses assigned to the plurality of proxy servers;
establishing, by the IPv6 proxy server, an IPv6 communications connections between the IPv6 proxy server and the target computer using the IPv6 address of the target computer and the IPv6 address of the IPv6 proxy server;
in response to determining that the one or more IP addresses does not include the IPv6 address of the target computer:
determining whether an IPv4 address of the target computer is included in the one or more IP addresses of the target computer:
determining whether the plurality of proxy servers includes an IPv4 proxy server configured to handle IPv4 communications;
in response to determining that the plurality of proxy servers includes an IPv4 server:
selecting an IPv4 address of the IPv4 proxy server from the pool of IP addresses assigned to the plurality of proxy servers;
establishing, by the IPv4 proxy server, an IPv4 communications connections between the IPv4 proxy server and the target computer using the IPv4 address of the target computer and the IPv4 address of the IPv4 proxy server.

2. The computer system of claim 1, further comprising instructions stored in the storage media that, when executed by the one or more computer processors, cause the one or more computer processors to perform:
determining, by the proxy server, identification-information of the client;
determining, by the proxy server, an address used by either the IPv6 proxy server or IPv4 proxy server to connect to the target computer.

3. The computer system of claim 2, further comprising instructions stored in the storage media that, when executed by the one or more computer processors, cause the one or more computer processors to perform:
determining, by the proxy server, an address pair and including, in the address pair, the address and the identification-information of the client.

4. The computer system of claim 3, further comprising instructions stored in the storage media that, when executed by the one or more computer processors, cause the one or more computer processors to perform:
determining, by the proxy server, whether the identification-information of the client comprises a username that is unique in a computer network in which the proxy server is implemented;
in response to determining that the username of the client is unique, assigning, by the proxy server, the address pair of the proxy server to the username of the client.

5. The computer system of claim 4, further comprising instructions stored in the storage media that, when executed by the one or more computer processors, cause the one or more computer processors to perform:
in response to determining that the username of the client is not unique, determining, by the proxy server, whether an IP address of the client computer is unique in the computer network in which the proxy server is implemented;
in response to determining that the IP address of the client computer is unique, assigning, by the proxy server, the address pair of the proxy server to the IP address of the client computer.

6. The computer system of claim 5, further comprising instructions stored in the storage media that, when executed by the one or more computer processors, cause the one or more computer processors to perform:
in response to determining that the IP address of the client computer is not unique, determining, by the proxy server, whether a tuple including the IP address of the client computer and a port identifier of a port on which the proxy server received the request is unique in the computer network in which the proxy server is implemented;
in response to determining that the tuple including the IP address of the client computer and the port identifier of the port is unique, assigning, by the proxy server, the address pair of the proxy server to the tuple.

7. The computer system of claim 1, further comprising instructions stored in the storage media that, when executed by the one or more computer processors, cause the one or more computer processors to perform:
in response to determining that the one or more IP addresses of the target computer neither include an IPv6 address nor an IPv4 address, generating and transmitting an error message in a same step.

8. A computer-implemented method comprising:
receiving, at a proxy server of a plurality of proxy servers, a request from a client executing on a client computer for access to a target computer;
requesting one or more IP addresses of the target computer from a Domain Name System (DNS) server;
upon receiving the one or more IP addresses of the target computer, determining whether the one or more IP addresses include an IPv6 address of the target computer;
in response to determining that the IPv6 address of the target computer is included in the one or more IP addresses of the target computer:
  determining whether the plurality of proxy servers includes an IPv6 proxy server configured to handle IPv6 communications;
  in response to determining that the plurality of proxy servers includes the IPv6 proxy server:
    selecting an IPv6 address of the IPv6 proxy server from a pool of IP addresses assigned to the plurality of proxy servers;
    establishing, by the IPv6 proxy server, an IPv6 communications connections between the IPv6 proxy server and the target computer using the IPv6 address of the target computer and the IPv6 address of the IPv6 proxy server;
in response to determining that the one or more IP addresses does not include the IPv6 address of the target computer:
  determining whether an IPv4 address of the target computer is included in the one or more IP addresses of the target computer:
    determining whether the plurality of proxy servers includes an IPv4 proxy server configured to handle IPv4 communications;
      in response to determining that the plurality of proxy servers includes an IPv4 server:
      selecting an IPv4 address of the IPv4 proxy server from the pool of IP addresses assigned to the plurality of proxy servers;
      establishing, by the IPv4 proxy server, an IPv4 communications connections between the IPv4 proxy server and the target computer using the IPv4 address of the target computer and the IPv4 address of the IPv4 proxy server.

9. The method of claim 8, further comprising:
determining, by the proxy server, identification-information of the client;
  determining, by the proxy server, an address used by either the IPv6 proxy server or IPv4 proxy server to connect to the target computer.

10. The method of claim 9, further comprising:
determining, by the proxy server, an address pair and including, in the address pair, the address and the identification-information of the client.

11. The method of claim 10, further comprising:
determining, by the proxy server, whether the identification-information of the client comprises a username that is unique in a computer network in which the proxy server is implemented;
in response to determining that the username of the client is unique, assigning, by the proxy server, the address pair of the proxy server to the username of the client.

12. The method of claim 11, further comprising:
in response to determining that the username of the client is not unique, determining, by the proxy server, whether an IP address of the client computer is unique in the computer network in which the proxy server is implemented;
in response to determining that the IP address of the client computer is unique, assigning, by the proxy server, the address pair of the proxy server to the IP address of the client computer.

13. The method of claim 12, further comprising:
in response to determining that the IP address of the client computer is not unique, determining, by the proxy server, whether a tuple including the IP address of the client computer and a port identifier of a port on which the proxy server received the request is unique in the computer network in which the proxy server is implemented;
in response to determining that the tuple including the IP address of the client computer and the port identifier of the port is unique, assigning, by the proxy server, the address pair of the proxy server to the tuple.

14. The method of claim 8, further comprising:
in response to determining that the one or more IP addresses of the target computer neither include an IPv6 address nor an IPv4 address, generating and transmitting an error message in a same step.

15. A computer-readable storage medium storing one or more instructions which, when executed by one or more processors, cause the one or more processors to perform:
receiving, at a proxy server of a plurality of proxy servers, a request from a client executing on a client computer for access to a target computer;
requesting one or more IP addresses of the target computer from a Domain Name System (DNS) server;
upon receiving the one or more IP addresses of the target computer, determining whether the one or more IP addresses include an IPv6 address of the target computer;
in response to determining that the IPv6 address of the target computer is included in the one or more IP addresses of the target computer:
  determining whether the plurality of proxy servers includes an IPv6 proxy server configured to handle IPv6 communications;
  in response to determining that the plurality of proxy servers includes the IPv6 proxy server:
    selecting an IPv6 address of the IPv6 proxy server from a pool of IP addresses assigned to the plurality of proxy servers;
    establishing, by the IPv6 proxy server, an IPv6 communications connections between the IPv6 proxy server and the target computer using the IPv6 address of the target computer and the IPv6 address of the IPv6 proxy server;
in response to determining that the one or more IP addresses does not include the IPv6 address of the target computer:
  determining whether an IPv4 address of the target computer is included in the one or more IP addresses of the target computer:
    determining whether the plurality of proxy servers includes an IPv4 proxy server configured to handle IPv4 communications;
      in response to determining that the plurality of proxy servers includes an IPv4 server:

selecting an IPv4 address of the IPv4 proxy server from the pool of IP addresses assigned to the plurality of proxy servers;

establishing, by the IPv4 proxy server, an IPv4 communications connections between the IPv4 proxy server and the target computer using the IPv4 address of the target computer and the IPv4 address of the IPv4 proxy server.

16. The computer-readable storage medium of claim 15, further storing instructions for:

determining, by the proxy server, identification-information of the client;

determining, by the proxy server, an address used by either the IPv6 proxy server or IPv4 proxy server to connect to the target computer.

17. The computer-readable storage medium of claim 16, further storing instructions for:

determining, by the proxy server, an address pair and including, in the address pair, the address and the identification-information of the client.

18. The computer-readable storage medium of claim 17, further storing instructions for:

determining, by the proxy server, whether the identification-information of the client comprises a username that is unique in a computer network in which the proxy server is implemented;

in response to determining that the username of the client is unique, assigning, by the proxy server, the address pair of the proxy server to the username of the client.

19. The computer-readable storage medium of claim 18, further storing instructions for:

in response to determining that the username of the client is not unique, determining, by the proxy server, whether an IP address of the client computer is unique in the computer network in which the proxy server is implemented;

in response to determining that the IP address of the client computer is unique, assigning, by the proxy server, the address pair of the proxy server to the IP address of the client computer;

in response to determining that the IP address of the client computer is not unique, determining, by the proxy server, whether a tuple including the IP address of the client computer and a port identifier of a port on which the proxy server received the request is unique in the computer network in which the proxy server is implemented;

in response to determining that the tuple including the IP address of the client computer and the port identifier of the port is unique, assigning, by the proxy server, the address pair of the proxy server to the tuple.

20. The computer-readable storage medium of claim 15, further storing instructions for:

in response to determining that the one or more IP addresses of the target computer neither include an IPv6 address nor an IPv4 address, generating and transmitting an error message in a same step.

* * * * *